J. E. GRIDLEY.

Heating-Stove.

No. 8,469. Reissued Oct. 29, 1878.

WITNESSES

A. D. Hoffman

Jesse Cook Jr.

INVENTOR

James E. Gridley

Wm. M. E. Dayton

Attorney

N. PETERS, PHOTO-LITHOGRAPHER, WASHINGTON, D. C.

UNITED STATES PATENT OFFICE.

JAMES E. GRIDLEY, OF CHICAGO, ILLINOIS.

IMPROVEMENT IN HEATING-STOVES.

Specification forming part of Letters Patent No. 194,552, dated August 28, 1877; Reissue No. 8,469, dated October 29, 1878; application filed September 16, 1878.

*To all whom it may concern:*

Be it known that I, JAMES E. GRIDLEY, formerly of St. Paul, Minnesota, but now a resident of Chicago, State of Illinois, have invented certain new and useful Improvements in Heating-Stoves, of which the following is a specification, reference being had to the accompanying drawings, which form a part thereof.

Figure 1:
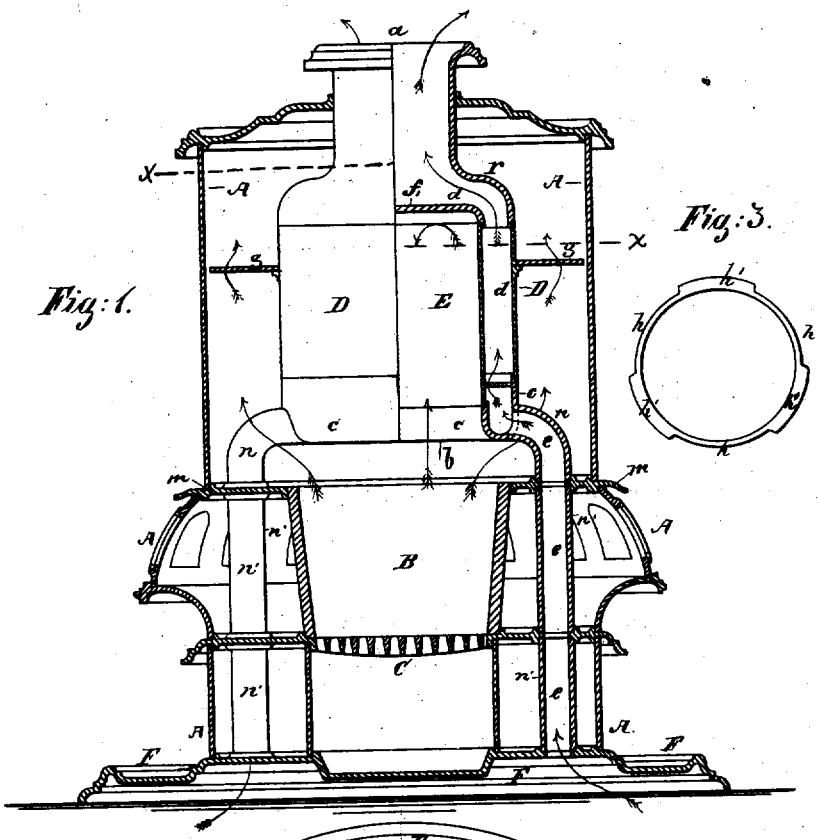
Figure 3:
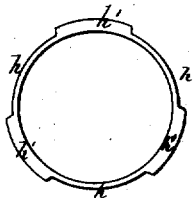
Figure 2:
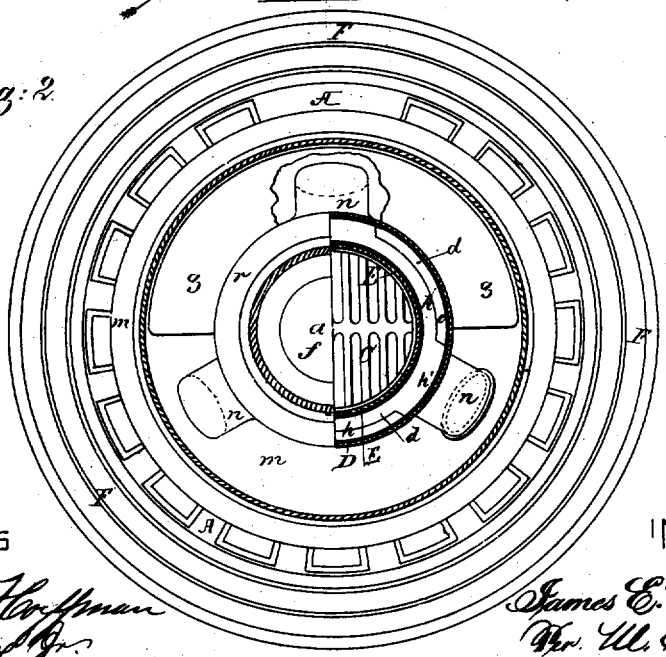

Figure 1 is a sectional side elevation. Fig. 2 is a plan view on line *x x*. Fig. 3 is a view of the heat check and spreader detached.

This invention relates to stoves and furnaces for heating purposes, and is an improvement on my invention secured by patent of June 13, 1876, No. 178,764.

It consists in a double drum located within the shell of the stove in the fire-chamber, above the fire, and having communication with the outside of the stove through a cold-air tube or tubes, which pass up inside the stove-shell from the bottom of the stove, near the floor, said double drum or generator being interiorly provided with a diaphragm or air-spreader, for the purpose of spreading or distributing the entering air over every part of the interior surface, as hereinafter more particularly described.

A is the outer casing or shell of the stove; B, the fire-pot, and C the grate, all arranged in the usual manner.

Suspended or supported in the fire-chamber of the stove, above the fire, is the double drum or hot-air generator, consisting of the outer drum, D, open at the top, and the inner drum, E, open at the bottom *b*. These drums are preferably of sheet-iron. They are connected at the bottom by a trough-shaped ring, *c*, which forms the bottom and a portion of the sides of the generator, and cuts off the interior *d* thereof from communication with the fire-chamber of the stove. The inner drum is closed at the top by the dome-plate *f*, and the outer drum is continued by the plate *r* to discharge at the top of the stove at *a*. The exit *a* may, however, be in the upper part of the side of the shell A if desired.

The generator-base *c* and the elbows or short flues *n* are formed solid in one piece, said short flues resting upon the horizontal plate *m*, within suitable flanges upon the latter, to hold the generator steadily in place.

Through *m* and the lower plates of the stove pass the vertical conduits *n'*, preferably of sheet-iron, giving, with *n*, the continuous passage *e* from beneath the bottom plate F to the interior *d* of the generator.

Placed in the lower part of the air-space *d*, just above the entrance of the flues *n*, is a diaphragm, *h*, having extended hoods *h'* directly opposite each flue-entrance to spread the entering air and bring it in contact with the heating-surfaces of the drums D and E.

The flues *n n'* being within the shell of the stove and proximate to the fire, the entire air-passage *e d a* is in some degree heated, so that the air, as it enters at the bottom plate F, is immediately raised in temperature. Within the generator it attains a high heat, and rapidly rises in a continuous current through the exit *a*, to be diffused throughout the a artment so long as a fire is maintained.

By the arrangement of the conduits and generator shown, a large percentage of heat, otherwise allowed to pass off with the smoke, is utilized, while the air passed through the generator is made much more healthful by being superheated.

Any number of admission-flues *n n'* may obviously be employed, and the deflecting-plate *g* may be advantageously placed in the heat-space about the generator to uniformly heat the outer drum.

Having thus described my invention, I claim and desire to secure by Letters Patent—

The combination and arrangement of the generator D E, air-spreader *h h'*, and inlet-flues *n n'*, substantially as described.

JAMES E. GRIDLEY.

Witnesses:
M. E. DAYTON,
JESSE COX, Jr.